United States Patent
Mehalchick et al.

[11] 3,896,048
[45] July 22, 1975

[54] CATALYST COMPOSITION

[75] Inventors: Emil J. Mehalchick, Towanda; Joseph J. Cleveland, Wysox; Robert A. Long, Towanda; Harry O. Schulze, Wyalusing; Paul K. Marshall, Towanda, all of Pa.

[73] Assignee: GTE Sylvania Incorporated, Stamford, Conn.

[22] Filed: Aug. 20, 1973

[21] Appl. No.: 389,900

[52] U.S. Cl............. 252/455 R; 252/462; 252/474; 423/213.2; 423/213.5
[51] Int. Cl............................................. B01j 11/22
[58] Field of Search................ 252/462, 474, 455 R; 423/213.2, 213.5

[56] References Cited
UNITED STATES PATENTS

| | | | |
|---|---|---|---|
| 3,656,915 | 4/1972 | Tourtellotte | 423/213.2 |
| 3,729,936 | 5/1973 | De Palma et al. | 423/213.2 |
| 3,767,764 | 10/1973 | Dolbear | 423/213.2 |

FOREIGN PATENTS OR APPLICATIONS

| | | | |
|---|---|---|---|
| 2,119,702 | 11/1971 | Germany | 252/462 |

*Primary Examiner*—Winston A. Douglas
*Assistant Examiner*—W. J. Shine
*Attorney, Agent, or Firm*—Norman J. O'Malley; John C. Fox; William H. McNeill

[57] ABSTRACT

A catalyst is disclosed for converting nitrogen oxide which consists essentially of an inorganic complex having the formula:

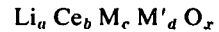

$$Li_a\ Ce_b\ M_c\ M'_d\ O_x$$

wherein M is a metal selected from the group consisting of copper and iron, M' is a metal selected from the group consisting of cobalt and nickel, $a$ is from about 0.01 to about 0.1, $b$ is from about 0.1 to about 1, $c$ is from about 0.25 to about 2.0 $d$ is from about 0.25 to about 1.0 and $x$ varies in direct chemical relationship to the individual values of $a$, $b$, $c$ and $d$. The catalyst disclosed is particularly effective in a specific embodiment which is supported on a ceramic substrate containing aluminum silicate. A process for depositing the catalyst upon such substrates is also disclosed.

22 Claims, No Drawings

CATALYST COMPOSITION

BACKGROUND OF THE INVENTION

1. Field of the Invention

This invention relates to a composition which is a catalyst for the removal of nitrogen oxide. More particularly, it is a catalyst composition employing specific metals combined in their oxide forms.

2. Prior Art

Compounds of rare earths and transition metals have been disclosed as being suitable oxidation catalysts for automotive exhaust systems. More notable of these is lanthanum-cobalt oxide ($LaCoO_3$). A recently issued patent, No. 3,737,396 discloses a composition comprising 5 to 12 percent copper, 0.5 to 2.0 percent manganese, and 0.5 to 4.0 percent cobalt. The materials combine with an alpha alumina substrate to become catalytic active.

It is believed, therefore, that a catalyst which will function to remove nitrogen oxide from gases and is not limited to the type of substrate upon which it is deposited is an advancement in the art.

OBJECTS AND SUMMARY OF THE INVENTION

It is an object of this invention to provide an improved catalyst for treating gases containing nitrogen oxides.

It is another object of this invention to provide a new composition of matter.

It is still another object of this invention to provide a catalyst supported upon a substrate.

It is an additional object of this invention to provide a process for depositing a catalyst upon a substrate.

These and other objects of this invention are achieved in one embodiment wherein a solid catalyst consisting essentially of a polycrystalline catalytic active inorganic complex having the formula:

$$Li_a Ce_b M_c M'_d O_x$$

wherein M is a metal selected from the group consisting of copper and iron, M' is a metal selected from the group consisting of cobalt and nickel, $a$ is from about 0.01 to about 0.1, $b$ is from about 0.1 to about 1, $c$ is from about 0.25 to about 2.0, $d$ is from about 0.25 to about 1.0 and $x$ varies in direct chemical relationship to the individual values of $a$, $b$, $c$ and $d$.

An additional embodiment of this invention provides a process where a suitable source of the foregoing metals is dissolved in a nitric acid solution, a suitable substrate is immersed in said solution and thereafter the resulting impregnated substrate is heated in an oxygen containing atmosphere for a sufficient time to convert the metals to the respective oxides, thereby achieving a catalytic active inorganic complex of the foregoing formula deposited upon a substrate.

DETAILS OF THE PREFERRED EMBODIMENT

For a better understanding of the present invention, together with other and further objects, advantages and capabilities thereof, reference is made to the following disclosure and appended claims in connection with the above description of some of the aspects of the invention.

As previously described, the composition is an inorganic complex of a polycrystalline structure. The complex has the formula:

$$Li_a Ce_b M_c M'_d O_x$$

wherein M is a metal selected from the group consisting of copper and iron, M' is a metal selected from the group consisting of cobalt and nickel, $a$ is from about 0.1 to about 0.1, $b$ is from about 0.1 to about 1, $c$ is from about 0.25 to about 2.0, $d$ is from about 0.25 to about 1.0 and x varies in direct chemical relationship to the individual values of $a$, $b$, $c$ and $d$.

The preferred range of lithium ($a$ in the before-mentioned formula) is from about 0.025 to about 0.075, although lithium can vary from about 0.01 to about 0.10 in the composition. Cerium, which stabilizes the transition metal is preferably in the range of about 0.50 to about 1.0 moles per mole of the composition. The value of c preferably varies from about 0.5 to about 1.5 and d from about .5 to 1.0. The oxygen content of the composition will vary in direct chemical relationship to a, b, c and d, depending upon the actual values of a, b, c and d.

M can be either copper or iron and M' can be either nickel or cobalt. Typical suitable materials include $Li_{0.05} Ce_{0.5} Cu_{1.5} Co_{0.5}$; $Li_{0.05} Ce_{0.5} Fe_{1.5} Ni_{1.0}$; $Li_{0.1} Ce_{1.0}$, $Fe_{1.0} Co_{1.0}$ and similar materials. The lithium-cerium-copper-nickel compounds are preferred.

Although other substrates can be used, a honeycomb structure of either cordierite (magnesium aluminum silicate) or mullite (aluminum silicate) is preferred. A honeycomb structure of at least about 200 cells per square inch is preferred, particularly for automotive exhaust catalysts. Other substrates which can be used are alpha alumina, beta spodumene, and gamma alumina pellets.

Although the preferred method of depositing the catalyst of this invention upon a substrate involves forming a solution and impregnating a substrate with the solution followed by hot oxidation thereof, conventional method of deposition can be used such as by forming an appropriate coating slurry of the catalyst in the oxide form, then using heat to remove the carrier. Other methods of coating can be used as is apparent to one skilled in the coating art.

Any appropriate metal source which will dissolve in water or react with nitric acid to form a solution can be used. Preferable sources are the nitrates of the desired metals. The metal sources are added to form a solution having the molar ration of lithium to cerium of from 1:1 to 1:100 and a molar ratio of lithium to each of M and M' each from about 2:5 to about 1:200. After dissolving the metal sources, whether nitrates are used or any other material which is soluble in nitric acid, the nitrates are obtained by evaporation of the water and thereafter are decomposed to form the catalytic active oxide.

The following test procedure is used in preliminary evaluating catalytic materials.

In this invention, the catalyst is applied to a monolithic support of ceramic material. Two ceramic materials are used for this evaluation, cordierite (magnesium aluminum silicate) and mullite (aluminum silicate).

In the subject invention, the mullite or cordierite support is immersed in an aqueous nitrate solution comprising the desired metals. The monolithic support is placed in the aqueous nitrate mixture for a period of 15–30 minutes at reduced pressure to remove trapped air from the structure. The impregnated structure is then drained of excess nitrate solution and dried in a forced air drying oven to partially decompose these mixed nitrates. The structure is then calcined in a furnace in an air atmosphere at 600°–850°C for a period of 0.5–2.0 hours.

The catalyst, which usually represents 10-15 percent by weight of the coated ceramic monolith, is tested both in a laboratory system and in a full-sized auto exhaust system such as a 351 CID Ford V-8 engine.

In a laboratory-size system, the catalyst-coated ceramic monolith, nominally 1 inch diameter by 1.5 inches long (200 cells/in$^2$) is placed in a thermostatically-controlled tube furnace. The calibrated feed gas containing nominally 1200 ppm NO, 1.5 percent CO and the balance $N_2$ is metered into the system at controlled flow rate and the temperature is incrementally increased. The exit gas is fed directly into a Scott chemiluminescence analyzer and the NO concentration is recorded on an x-y plotter which records NO concentration versus temperature. The temperature is increased until a minimum NO concentration is obtained. The temperature is further increased to 700°–800°C and held at that point for a period of one hour. The furnace is then allowed to cool gradually to room temperature and a plot is obtained of the activity of the catalyst vs temperature.

With this screening technique, many catalyst compositions can be evaluated for NO removal. The most promising compositions are then applied to full-sized ceramic structures, (4 ½ inches diameter by 3 inches long) (250–1000 cells/in$^2$) and are evaluated in the actual exhaust of a 351 CID Ford V-8 engine on a Clayton Dynamometer.

Full scale evaluation is made in the following manner. The 4 ½ × 3 inches ceramic structure is dip coated by the same technique used for the laboratory samples. In addition, the full-sized monoliths are, in most cases, prereduced in a 2 volume percent CO-argon atmosphere at 350°–500°C for a period of 0.5 to 4 hours.

The resultant catalytic converter is then placed in a stainless steel container which is attached to the exhaust system approximately 6″ from the exhaust manifold outlet on one bank of the 8 cylinder engine. This system is so arranged that continuous monitoring of the temperature and the exhaust gases upstreams and downstreams of catalytic unit can be effected.

The equipment used for analysis can include a Scott chemiluminescence analyzer for NO concentration; NDIR analyzers for CO and $CO_2$ concentrations, and F.I.D. analyzer for hydrocarbons, and a Scott oxygen analyzer. Thermal probes for measuring temperatures before and after the converter can be incorporated in the system. With this system the air to fuel ratio, the $CO/O_2$ ratio, and the NO reduction efficiency of the catalyst under actual engine exhaust conditions can be determined.

Ammonia determination can be done by a wet chemical method, such as by taking a portion of the exhaust gas down-stream from the reactor and scrubbing it with a saturated solution of boric acid. The solution is thereafter checked for the presence of ammonia by a standard titrimetric procedure.

To more fully explain the above invention, the following detailed example is given. All parts, percentages and proportions are by weight unless otherwise stated.

EXAMPLE I

An aqueous nitrate solution is prepared by dissolving the nitrates of the elements Li, Ce, Cu and Ni to yield an aqueous solution having the following molar concentrations:

Li (0.05); Ce (0.5); Cu (1.5); Ni (0.5). An aqueous solution of nitric acid is added to promote dissolution of the nitrates and a surfactant is used to promote wettability and uniformity of the catalyst coating on the ceramic structure.

A cordierite ceramic structure is processed as previously described and is placed in the test engine exhaust system.

The test results with this composition are shown in Table I.

TABLE I

| Engine (RPM) | 1820 | | 1460 | |
|---|---|---|---|---|
| Dynamometer Load (HP) | 38 | | 40 | |
| Gas Component | % Before | % After | % Before | % After |
| CO | 4.3 | 4.0 | 4.3 | 4.1 |
| $CO_2$ | 13.7 | 14.2 | 13.4 | 13.7 |
| NO | 0.1400 | 0.0005 | 0.08 | 0.008 |
| $O_2$ | 0.37 | 0.05 | 0.05 | 0 |
| H—C | 0.2940 | 0.2460 | 0.0945 | 0.0900 |
| Temp. °C | 580 | 620 | 580 | 620 |
| Manifold Vacuum (inches Hg) | 16 | | 12.3 | |

It is observed that the NO reduction efficiency is ≈90 percent at 1460 RPM and 40 HP load after 58 hours of operation under cold start conditions, various loading conditions, shutdowns and startups.

While there has been shown and described what are at present considered the preferred embodiments of the invention, it will be obvious to those skilled in the art that various changes and modifications may be made therein without departing from the scope of the invention as defined by the appended claims.

What is claimed is:

1. A solid catalyst composition comprising essentially of a polycrystalline catalytically active inorganic complex having the formula:

$$Li_a\ Ce_b\ M_c\ M'_d\ O_x$$

wherein M is a metal selected from the group consisting of copper and iron, M' is a metal selected from the group consisting of cobalt and nickel, a is from about 0.1 to about 0.1, b is from about 0.1 to about 1, c is from about 0.25 to about 2.0, d is from about 0.25 to about 1.0 and x varies in direct chemical relationship to the values of a, b, c and d.

2. A composition according to claim 1 wherein M is copper.

3. A composition according to claim 1 wherein M' is nickel.

4. A composition according to claim 1 wherein a is from about 0.025 to about 0.075.

5. A composition according to claim 1 wherein $b$ is from about 0.5 to about 1.0.

6. A composition according to claim 1 wherein $c$ is from about 0.5 to about 1.5.

7. A composition according to claim 1 wherein $d$ is from about 0.5 to about 1.0.

8. A composition according to claim 7 wherein $a$ is from about 0.025 to about 0.075, $b$ is from about 0.5 to about 1.0, $c$ is from about 0.5 to 1.5, M is copper and M' is nickel.

9. A process suitable for producing a catalytically active structure comprising a porous substrate impregnated with a catalytically active metal oxide complex, the process comprising:
   a. forming an aqueous solution of soluble metal sources thermally decomposable to metal oxides consisting essentially of a lithium source, a cerium source, a metal source M selected from the group consisting of copper and iron and a metal source M' selected from the group consisting of nickel and cobalt, the molar ratio of lithium to cerium being from 1:1 to 1:100 and the molar ratio of lithium to said M and M' metals each being from about 2:5 to about 1:200;
   b. immersing a porous substrate in said solution under reduced pressure for a time sufficient to impregnate the pores thereof;
   c. drying said impregnated substrate; and
   d. heating the resulting impregnated substrate at a temperature of from about 600 to about 850°C for about 0.5 to about 2 hours in an oxygen containing atmosphere, thereby to convert the substrate to a catalytically active structure comprising the porous substrate impregnated with a catalytically active metal oxide complex.

10. A process according to claim 9 wherein said metal sources are nitrates of the foregoing metals.

11. A process according to claim 9 wherein nitric acid is added to said solution prior to immersion of said substrate.

12. A process according to claim 11 wherein said substrate is a ceramic substrate.

13. A process according to claim 12 wherein said ceramic is selected from the group consisting of cordierite and mullite.

14. A catalytic active structure comprising a ceramic substrate relatively uniformly coated with a catalytic complex of the formula:

wherein M is a metal selected from the group consisting of copper and iron, M' is a metal selected from the group consisting of cobalt and nickel, $a$ is from about 0.01 to about 0.1, $b$ is from about 0.1 to about 1, $c$ is from about 0.25 to about 2.0, $d$ is from about 0.25 to about 1.0 and $x$ varies in direct chemical relationship to the values of $a$, $b$, $c$ and $d$.

15. A structure of claim 14 wherein said substrate is selected from the group consisting of cordierite and mullite.

16. A structure according to claim 14 wherein said substrate is honeycomb shaped having at least 200 cells per square inch.

17. A structure according to claim 16 wherein said structure is cordierite.

18. A structure according to claim 16 wherein said structure is mullite.

19. A structure according to claim 16 wherein in said catalytic complex $a$ is from 0.025 to 0.075, $b$ is from 0.5 to 1.0, $c$ is from 0.5 to 1.5, and $d$ is from 0.5 to 1.0.

20. A structure according to claim 19 wherein M is copper.

21. A structure according to claim 20 wherein M' is nickel.

22. A structure according to claim 21 wherein said ceramic is cordierite.

* * * * *

UNITED STATES PATENT OFFICE
CERTIFICATE OF CORRECTION

PATENT NO. : 3,896,048
DATED : July 22, 1975
INVENTOR(S) : Emil J. Mehalchick, Joseph J. Cleveland, Robert A. Long, Harry O. Schulze and Paul K. Marshall It is certified that error appears in the above-identified patent and that said Letters Patent are hereby corrected as shown below:

Col. 2, line 6 - Please delete "0.1 to about 0.1" and insert -- 0.01 to about 0.1 --.

Col. 2, line 47 - Please delete "ration" and insert -- ratio --

Col. 4, line 51 - Please delete "comprising" and insert -- consisting --.

Col. 4, line 58 - Please delete "0.1" and insert -- 0.01 --.

Col. 6, line 20 - Please delete "structure of claim 14" and insert -- structure according to claim 14 --.

Signed and Sealed this twenty-eight Day of October 1975

[SEAL]

Attest:

RUTH C. MASON
Attesting Officer

C. MARSHALL DANN
Commissioner of Patents and Trademarks